United States Patent [19]

McNelley

[11] Patent Number: 5,438,357
[45] Date of Patent: Aug. 1, 1995

[54] IMAGE MANIPULATING TELECONFERENCING SYSTEM

[76] Inventor: Steve H. McNelley, 29677 Woodlake Ct., San Juan Capistrano, Calif. 92675

[21] Appl. No.: 156,009

[22] Filed: Nov. 23, 1993

[51] Int. Cl.$^6$ ............................ H04M 11/00; H04N 7/14
[52] U.S. Cl. ............................................. 348/15; 348/14; 348/20; 382/118
[58] Field of Search ................... 348/14, 15, 16, 17, 348/18, 19, 20; H04N 7/14; 379/96, 202, 203, 204, 205, 206; 382/2, 48, 10

[56] References Cited

U.S. PATENT DOCUMENTS

| | | |
|---|---|---|
| 4,400,725 | 8/1983 | Tanigaki . |
| 4,894,715 | 1/1990 | Uchikubo et al. . |
| 4,928,301 | 5/1990 | Smoot . |
| 4,980,761 | 12/1990 | Natori . |
| 4,996,592 | 2/1991 | Yoshida . |
| 5,117,285 | 5/1992 | Nelson et al. . |
| 5,159,445 | 10/1992 | Gitlin et al. . |
| 5,187,574 | 2/1993 | Kosemura et al. ............... 382/2 |
| 5,231,674 | 7/1993 | Cleveland et al. ............... 382/48 |
| 5,780,530 | 1/1994 | Trew et al. ............... 348/20 |

FOREIGN PATENT DOCUMENTS

| | | | |
|---|---|---|---|
| 0228890 | 9/1988 | Japan | H04N 7/14 |
| 0289389 | 11/1989 | Japan | H04N 7/14 |

OTHER PUBLICATIONS

WO92/02000A, Shackleton, Feb. 6, 1992. "A Method of Processing an Image".
Real-Time Robot Vision System Based on Correlation Technology, Hirochika Inoue et al, Dept. of Mechano–Informatics, University of Tokyo.
A Large–Screen Visual Telecommunication Device Enabling Eye Contact, Shinichi Shiwa et al, SID 91 Digest, pp. 327–328.
Iscan High Speed Eye Tracking & Pupillometry Systems, 1988–1989 Catalogue.
An Intelligent Facial Image Coding Driven by Speech and Phoneme, Shigeo Morishima et al, Seikei University, Musashino Tokyo Japan & Tokyo University, Japan.
Non–Intrusive Gaze Tracking Using Artificial Neural Networks, Shumeet Baluja et al, 5 Jan. 1994, CMU–C–S–94, pp. 3–14.

*Primary Examiner*—Curtis Kuntz
*Assistant Examiner*—Stella L. Woo
*Attorney, Agent, or Firm*—Price, Gess & Ubell

[57] ABSTRACT

A teleconferencing system that allows for natural eye contact between conferees is provided. The system comprises two or more terminals which are connected to allow a teleconference to occur. Each terminal comprises a screen to display an image of the remote conferee and a video camera to transmit an image of the local conferee to the remote screen. The video camera is conveniently located above the screen, beyond the perimeter of the image. Microphones and speakers are also provided to allow the conferees to hear as well as speak to one another. Eye contact is provided, despite the mounting of the camera above eye level, by image manipulating the image of a conferee to remove any distortion caused by camera placement and to redirect the apparent direction of the conferee's gaze. Image manipulation can also simulate zooming, tilting and panning of the camera by expanding that portion of the camera field that frames the conferee to fill the entire screen and by keeping the conferee's image so centered in spite of movement by the conferee.

29 Claims, 5 Drawing Sheets

IMAGE MANIPULATING TELECONFERENCING SYSTEM

BACKGROUND OF THE INVENTION

1. Field of the Invention

Telecommunication and, more specifically, a video teleconferencing system that allows conferees to converse naturally.

2. Introduction

For decades individuals have attempted to make teleconferencing into a technology that can replace the telephone as the primary technology for communicating from remote locations. The names "teleconferencing," "video teleconferencing," "video-conferencing," and "video-phone" all refer to both audio and visual communication from separate locales and all are the subject of this invention. Soon, with the completion of the nationwide digital infrastructure, it will be possible to transfer large amounts of live high-resolution video signals inexpensively. It is foreseeable that teleconferencing may become the preferred technology of choice for communicating from separate locations and that video-phone teleconferencing may become as significant a communication breakthrough as the telephone itself.

Although matters of signal compatibility and "information superhighways" may greatly influence the ultimate success of teleconferencing, apparently simple matters such as the placement of the camera may be even more important. The arrangement of mounting a video camera on the outside perimeter of a television monitor remains today the most common layout for a system of teleconferencing. This teleconferencing arrangement, however, has significant drawbacks that limit its successful use in providing natural conversation. First, when a conferee looks at the image of the other conferee on the monitor he/she attempts to make eye contact as in a normal conversation. Unless the video camera is directly behind the image on the screen, the conferee will fail to look into the video camera. At the same instance, the other conferee will do exactly the same thing and will also fail to look directly into the video camera. In such a situation the conferees can see one another but do not achieve eye contact. This is known as a parallax problem and is a significant deterrent to having natural conversation. Human beings are conditioned to expect eye contact. When someone avoids eye contact, one unconsciously assumes they are lying or perhaps hostile. Thus, a failure to make eye contact can be fatal to teleconferencing.

When the video camera is mounted above the monitor, to the conferee viewing the transmitted image the other conferee appears to be looking in a downward direction. Likewise, when the video camera is mounted at the bottom of the monitor, the imaged conferee seems to look upward, and when the camera is mounted to the left or to the right of the monitor, the imaged conferee appears to be gazing to the right or the left, respectively. Another drawback to the perimeter-mounted video camera has been the difficulty of correctly framing a person's image. When a conferee moves from left to right or up and down or back and forth, his image leaves the frame and/or is off-center or is too small or too large. This framing problem is distracting and affects the quality of conversation. To avoid this problem the conferees must not move while conversing. This enforced stillness can be uncomfortable and prevents natural conversation because most people often move and shift their body positions.

3. Related Art

The parallax problem is not unique to teleconferencing. It is a common problem in television broadcasting where an announcer must be able to look straight into a television camera and yet still be able to read a printed script. Consequently, some of the prior art comes from the broadcasting industry. Various prompting systems comprising transparent mirrors or polarizing screens have been perfected to cause the text to seem to float in front of the announcer so he can read the material and look at the camera at the same time.

A number of similar systems comprised of polarizers and transparent mirrors have been developed for teleconferencing. U.S. Pat. No. 5,117,285 to Nelson et al. mounts a single-angled mirror and a camera to the front of a monitor. The camera is aimed at the critical angle at the transparent mirror so that it views a reflected image of the conferee. Meanwhile, the conferee is able to look through the transparent mirror to see the monitor and the image of the second conferee. U.S. Pat. No. 4,928,301 to Smoot uses a transilluminated liquid crystal screen and a rear projection system to achieve eye contact. The screen alternates rapidly from a transparent mode in which a rear-mounted camera can capture the local conferee and a translucent mode in which the image of the remote conferee is rear-projected on the screen. U.S. Pat. No. 4,400,725 to Tanigaki teaches the use of a Braun tube as an image screen that alternates between an image display mode and a transparent mode in which a rear-mounted camera views the conferee. Still another system is taught by U.S. Pat. No. 5,159,445 to Gitlin et al., where a video camera is mounted behind the viewing side a flat panel display screen which can switch from image-producing mode to a transparent mode.

These technologies represent the prior art for creating eye contact, and each has significant limitations. These devices are often bulky, and require a specially designed, expensive monitor other than the type normally used for television or computers. In addition, they are often awkward, having variously angled polarizers and mirrors and a camera protruding from the image screen. Lastly, all of these technologies fail to allow natural conversation where conferees can move freely and yet remain centered in the image frame.

An automatic tracking device that pans, tilts, and zooms a video camera has been successfully demonstrated in the prior art. This device consists of a platform that mechanically pans and tilts. It tracks the person being shot by means of a homing device placed on the person or contained in a hand-held microphone. It is designed primarily for speakers that are giving presentations and, thus, are moving about in a room. The significant drawbacks to this system are its having a limited life due to it being mechanical and its cumbersome size when placed atop a monitor for teleconferencing. The pan, tilt, and zoom requirements for the great majority of teleconferencing needs are more subtle than the previous devices' design requirements due to the conferee remaining in a limited area in order to view the other conferee's image on the monitor.

The prior art has also produced methods of simulating panning and framing without mechanically moving the camera or lens. The medical arts have developed electronic endoscopes for imaging internal body organs at a number of magnifications. U.S. Pat. No. 4,894,715 to Uchikubo et al. teaches such an endoscope with an electronic "zooming" function. U.S. Pat. No. 4,9996,592 to Yoshida teaches a video apparatus that is capable of changing the apparent field of view of a video frame by electronically selecting a portion of a digitized image and committing the selected portion to an electronic memory. However, this device does not store the entire image for remote selection and manipulation.

SUMMARY OF THE INVENTION

Given the drawbacks of the prior art, it is the object of the present invention to provide conferees with a means to have the natural conversational appearance of eye contact and provide conferees with automatic tracking of their own image while teleconferencing.

It is a further object to provide a system wherein the local teleconferencing terminal can either deliver, to a remote terminal, a processed signal which contains the desired eye contact appearance and image framing or can transmit an entire "raw" signal to a remote terminal for processing at that terminal.

The present invention uses image manipulation techniques to provide both the appearance of eye contact and automatic tracking and framing of the image, and thus substantially improves the teleconferencing experience. Furthermore, the present invention conveniently integrates with image display devices such as those commonly used for television and computers.

The objects of the present invention are met by a teleconferencing system in which the conferees view each other's images on typical display devices such as a television screen. A pickup image camera is mounted preferably on the top of the screen. The camera can be a high-resolution charge-coupled device or similar device equipped with a wide-angle lens so that the field of view is much greater than that necessary to encompass the conferee. The signal from the image pickup camera is digitized, either by the camera or a separate digitizing device, and fed to a pattern recognition/image manipulation system. That system recognizes and selects from the whole field of view the image portion containing the conferee. These data are used to create an image that is correctly framed around the conferee. At the same time, the image manipulation system corrects the apparent direction of the conferees glance to effect eye contact and corrects other distortions caused by the wide-angle lens and the angle of camera view. This corrected information is then transmitted to the teleconferencing terminal of the second conferee. Alternatively, the uncorrected or partially corrected signal can be transmitted, thereby allowing the other terminal to select and control the framing.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

BRIEF DESCRIPTION OF THE PREFERRED EMBODIMENT

Figure 1:
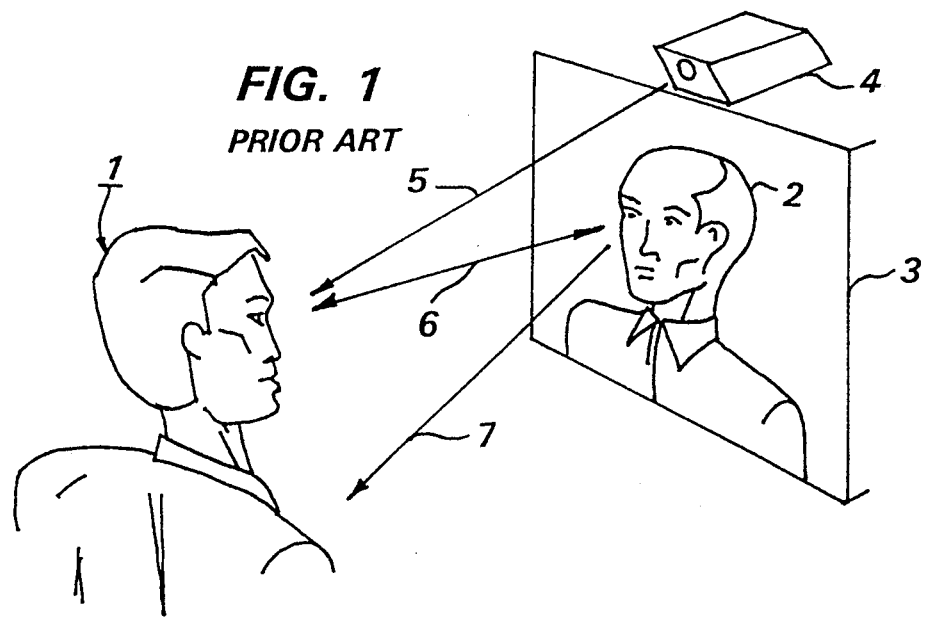
FIG. 1 schematically illustrates the prior art and the eye direction correction as described in this present invention.

FIG. 1 illustrates the prior art of an image pickup device 4 mounted on the perimeter of an image display screen 3 resulting in the lack of eye contact between conferee 1 and conferee 2 who is using a similar teleconferencing terminal. Conferee 1 looks straight ahead (focal direction 6) at conferee 2. Hence, conferee 1 does not look into the image pickup device 4. The image pickup device 4, in this arrangement, is directed down (focal direction 5) at conferee 1. Conferee 2 displayed on image display screen 3 appears to be looking down (focal direction 7) at the stomach of conferee 1 as a result of a similar top-mounted image pickup 4 device at conferee 2's terminal. Image manipulation of the direction of conferee 2's gaze will cause conferee 2 to appear to look straight ahead to conferee 1 (focal direction 6). As will be explained below, image manipulation of conferee 2 will allow natural conversation to occur between the conferees.

Figure 2A:
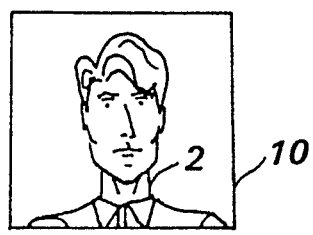
FIG. 2A-G schematically illustrates the prior art of a stationary image pickup device where the captured image is displayed showing the conferee framed in one desirable and many undesirable positions in the image.
Figure 2B:
Figure 2D:
Figure 2F:
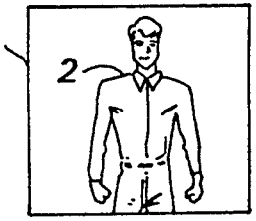
Figure 2C:
Figure 2E:
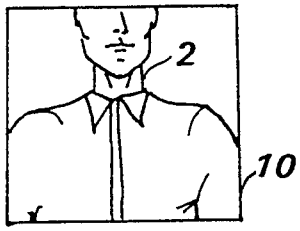
Figure 2G:

A stationary image pickup device has inherent drawbacks, as illustrated in FIG. 2B-G. In FIG. 2A conferee 2 is positioned in a preferred bust shot that is balanced within the display frame 10. Other commonly preferred shots (not shown) include a tighter head shot or one that includes both the head and the chest of the conferee. In all these preferred shots the conferee remains balanced in the display frame 10, and there is no distraction from the teleconferencing illusion of face-to-face conversation. However, the conferees must remain relatively motionless so that they remain in a balanced position in the display frame 10. The need to remain still is especially critical for closeup shots. FIGS. 2B-G are examples where conferee 2 is poorly framed in display frame 10. If conferee 2 shifts to his/her right as in FIG. 2B or to his/her left as in FIG. 2C, he/she does not remain centered in display frame 10. FIG. 2D illustrates conferee 2 shifting downward in display frame 10, and FIG. 2E illustrates conferee 2 shifting upward in the display frame 10. Both FIG. 2D and FIG. 2E do not include important features of the conferee and, hence, interfere with natural conversational communication. Lastly, FIG. 2F illustrates the result of conferee 2 having moved backwards, which makes his/her image in display frame 10 too small. FIG. 2G shows the result of the conferee 2 having moved so that only a portion of the face appears in display frame 10. Combinations of these poor conferee positions are, of course, also possible. For example, a conferee could be too close, as is illustrated in FIG. 2G, and could also have shifted downward, as illustrated in FIG. 2D. The present invention provides a means to allow a conferee to move about and still remain in a preferred position within the image display frame 10, as illustrated in FIG. 2A or in other preferred poses as determined by the conferees.

Image manipulations refer to any alteration of an image captured from an image pickup device. Manipulations may involve one technique or combinations of techniques. Many of these techniques employ computer technology that manipulates images that are first broken down into digital information. Image manipulations may involve generating image elements, deleting image elements, shifting image elements, replacing image elements, reducing or enlarging image elements and edge blurring to blend elements with other elements.

Today, one of the most common uses of image manipulation is to create special effects for motion pictures or video advertisements. In those cases, image manipulations occur during post production where technicians can spend considerable time to add a herd of dinosaurs or create some other illusion. The present invention, by its very nature, does not permit post-production manipulations because the image manipulations must appear to occur in real time to permit natural conversation. The image manipulation techniques to be employed must occur automatically within specific predetermined parameters to create the desired image results.

Figure 3B:
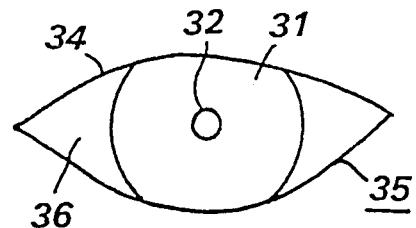
FIG. 3A-B schematically illustrates an eye looking downward and an image-manipulated eye looking forward.
Figure 3A:
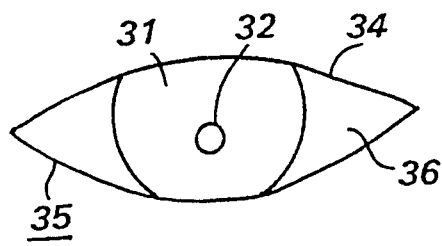

As mentioned above, one of the main impediments to proper eye contact is the misdirected gaze of the conferees. Image manipulations can be used to alleviate this problem. FIG. 3A illustrates one of many corrections that can be applied to an eye 35 that looks downward. Such an image could result from a teleconferencing system where the image pickup device is located above the image display screen. FIG. 3B illustrates the same eye 35 after image manipulation to make the eye 35 appear to be looking straight ahead. The iris 31 of FIG. 3A is image manipulated to expose a greater circumference and exposed area as seen in FIG. 3B and directed to a specified imaginary point. The pupil 32 of FIG. 3A is raised to a center position as seen in the pupil 32 of FIG. 3B. The upper eyelid's arc 34 in FIG. 3A is raised to the eyelid arc 34 of FIG. 3B. The lower eyelid remains unchanged. The whites 36 of FIG. 3A is enlarged to expose more whites 36 in the image manipulated eye of FIG. 3b.

Image manipulation techniques can also generate shadings, reflections, and other textures to accurately recreate a realistic-looking eye. Image manipulations can be used even when a conferee is wearing glasses as long as the pattern of the eye is distinguishable through the glass lenses. In some situations the distortion of corrective lenses and/or sunglass lenses may render clear patterns unnoticeable. In these situations the image manipulation processes would be suppressed. The described figures demonstrate only one of numerous situations where image manipulations is employed to enhance the natural appearance of teleconferees.

The present invention uses image manipulation to provide natural conversation by changing the apparent direction a conferee gazes, as well as to provide natural conversational appearance when a conferee looks away from the teleconferencing terminal (such as looking down at a piece of paper on a desk). Image manipulation parameters may be designed to activate only when the conferee looks at the terminal. With such a configuration the image manipulations begin when the conferee looks at the monitor and stop when the conferee looks away. In another configuration, image manipulation does not abruptly stop and start, but instead provides a subtle transition when the conferee looks away from the image display screen. The present invention is intended to make the whole teleconferencing experience a natural conversational experience and employs image manipulations to achieve this means.

Figure 4B:
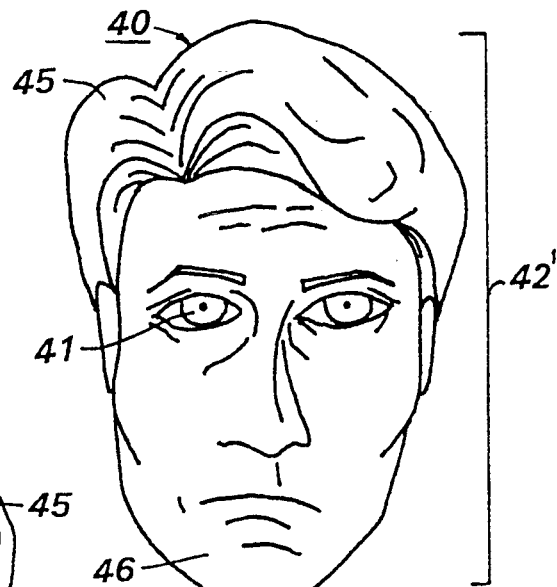
FIG. 4A-B illustrates a top-mounted camera angle of a conferee and a preferred angle appearance.
Figure 4A:
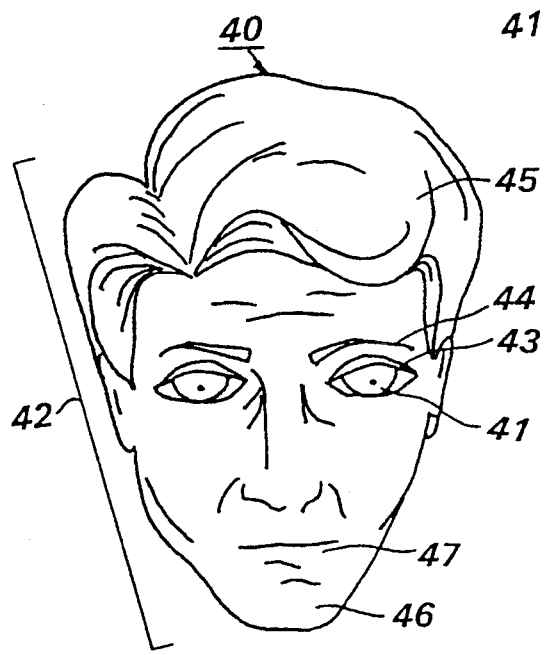

More than just eye position may have to be altered to effect optimum eye contact. FIG. 4A illustrates the appearance of a head 40 and eye direction of an image of a conferee produced by a video camera mounted on top of a monitor. In FIG. 4A the head 40 appears to be angled downward 42, resulting in more of the top 45 of the head to be exposed. In addition, the eyebrow 44 appears to draw closer to the eye 43, and the eyes appear to be looking downward (note iris 41 position). The chin 46 seems closer to the mouth 47. The preferred appearance of a conferee is illustrated in FIG. 4B. The conferee's head 40 gazes straight ahead (note position of iris 41). Also, the conferee head 40 is positioned in a natural perpendicular face-to-face position 42'. Image manipulations may include repositioning the head of FIG. 4A to the appearance of FIG. 4b, especially when extreme distortions of the head occur, as when the video camera's angle of view departs significantly from the horizontal. When the angle of the video camera is nearer the horizontal, it may not be necessary to image manipulate the position of the head. Instead, image manipulation of only the direction of the eyes (and possibly the eyelids) may be sufficient. Thus, the present invention employs image manipulations of any features of a conferee in order to provide natural conversational appearance of being face-to-face and having eye-to-eye contact.

Figure 5:
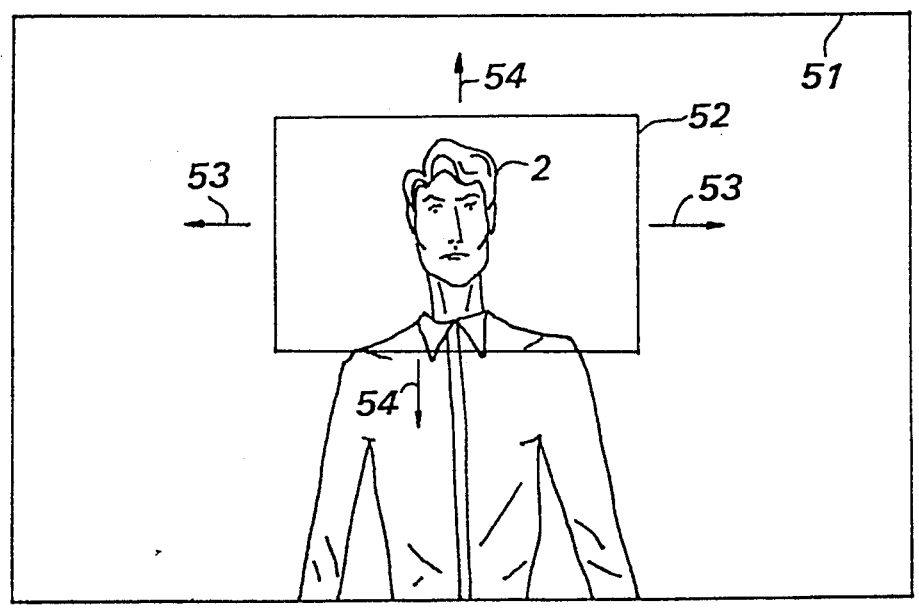
FIG. 5 schematically illustrates image manipulations enabling automatic tracking including panning, tilting, and zooming.

FIG. 5 illustrates image manipulations that track a conferee while he/she moves. Outer perimeter 51 represents the entire focal area of an image pickup device 4, while image portion 52 is the desired framing of conferee 1. Perimeter 51 contains the area about which a conferee may move and still be tracked. A wide angle lens may be used to expand the size of focal area 51, allowing the conferee 1 a larger area in which to move about. A drawback to extreme wide angle lenses is that the wider the lens, the more the image becomes distorted. Image manipulation may also be used to correct distortions caused by wide angle lenses. The area within the image portion 52 is enlarged to fill the entire image display screen 3, eliminating the image information between the edge of focal area 51 and image portion 52. Arrows 53 illustrate the direction that image portion 52 is moved within focal area 51 to create the appearance of right and left panning of the camera. Arrows 54 illustrate the direction that image portion 52 is moved within focal area 51 to create the appearance of up and down tilting of the camera. Image portion 52 can also expand or contract to create the appearance of zooming in or out. Panning movements (arrows 53), tilting movements (arrows 54), and zooming movements may be used together as is necessary. In FIG. 5 conferee 1 is positioned within image portion 52 in a preferred balanced shoulder and head shot. Other preferred shots may contain, within image portion 52, the head only or the head and the upper body of the conferee 1. The conferees can choose their preferred shot using preset controls 80, (FIGS. 6-7) to choose from several different preferred shots.

Before image manipulations can proceed, it is necessary to know what image elements are to be manipulated. The spatial orientation of the conferee 1 is needed to determine the tracking functions, and also, the spatial orientation of the physical features of a conferee is needed to change the direction he/she gazes. There are several ways to achieve the detection of the conferee's spatial orientation. One way is to place a homing device on the conferee and then use sensors to triangulate the conferee's location. Homing devices and sensors can employ technologies such as infrared, radio signals, heat, etc. The homing device would integrate well with the image-manipulated tracking system, because it would locate the exact location of the conferee. The homing device could be built into a lavaliere microphone or a hand-held microphone. A homing device, however, would not be able to determine specific physical features such as eye direction.

Pattern recognition and, more specifically, computer-assisted pattern recognition, will achieve detection of the conferee's location and specific physical features. Pattern recognition scans an image for predetermined characteristics. Those characteristics are identifiable patterns such as shapes, colors, reflective quality, and texture. In the case of image-manipulated tracking, the characteristics of a person's neck size compared to head size and shoulder width forms a pattern that can be used to locate the person in the image. Once this pattern has been recognized, the image portion 52 of FIG. 5 can be determined and then image-manipulated to enlarge it to fill the entire display screen 3. In the case of determining the direction of a conferee's gaze, scanning for several different patterns provides the necessary information for image manipulations which alter the apparent direction of a conferee's gaze. The relationship between the iris of an eye and the white of an eye, the iris and white in relation to the eyelid, the shape of the iris, the pupil in relation to the iris, the contrast in colors, the reflective nature of the eye in contrast to the skin, and the upper eyelid in relation to the skin under the eyebrows are just a few of the numerous patterns that can form the basis for pattern recognition. Pattern recognition can also analyze patterns that are two- and three-dimensional. Once the pattern recognition system has determined the direction that a person's eyes gaze, image manipulations correct the gaze to any desired direction. The direction of gaze can also be determined by reflecting a light beam from the eye or by a similar method of directly interrogating the eye's position.

Pattern recognition and image manipulation require a computer system that can carry out the recognition and manipulation processes quickly enough to allow conferees to converse without interruption. The area of computing discipline that is concerned with high-speed image processing is referred to as real-time hardware and software. With the ever-increasing speed of new generation processors, pattern recognition and image manipulation by a single processor will soon be available at prices within reach of the consumer market. However, even if available hardware is not fast enough, there are ways to get around the problem. Usually, pattern recognition scanning starts on one edge of the image and scans to the opposite edge searching for a particular pattern. This process can use up critical time. Scanning time can be reduced by beginning the scan in the place where the searched for elements are most likely to be located. For example, in a search for a conferee's eyes, it would be logical to start near the center of the image portion 52 if a centered bust shot were being employed. Another technique to decrease apparent processing time is to employ two or more processors. For example, a 30 frame-per-second format could use two processors where each processor alternates frames, allowing each processor to calculate data at a rate of 15 frames per second instead of calculating data at 30 frames per second, such as when the task is undertaken by a single processor. With such a configuration the image quality of 30 frames per second is realized, and the available processing time is essentially doubled.

Image processing using multiple processors may cause a delay of the image signal of 1/30 of a second. Given the nature of conversation with one or more second pauses between verbal exchanges, 1/30 or even 1/15 of a second delay does not add a noticeable technological intrusion to conversation. However, it may be necessary to use well-known methods to synchronize the audio with the delayed image signal, especially if the hardware limitations creates a significant delay.

Image manipulations may cause reduction in image resolution, especially when portions of an image are enlarged. Resolution may be improved digitally with the use of resolution-enhancing procedures that use spline interpolations, gradient formulas, antialiasing, and other similar techniques. Another way to increase the resolution of an enlarged image is to redesign the image pickup device so that only the image portion is exposed in the focal area of the image capturing device. That is to say, need for magnification of part of an image is eliminated by using two image pickup devices, in which one device is dedicated to pattern recognition and signals the image capturing element of the other image-pickup device to move its focal area to encompass the selected image portion. Another and less complicated image pickup device intended to increase image resolution would be one that uses a significantly higher image resolution capturing element so that even when a portion is enlarged, the resolution meets or exceeds the usual resolution requirement. For example an HDTV (High Definition Television) charged coupled device (CCD) can be used instead of NTSC (National Television Standards Commission) charge coupled device even though the final resolution requirement is only NTSC. In this case a sampled portion of the entire exposed image on an HDTV CCD when enlarged sufficiently matches the NTSC resolution requirement.

The image-manipulated tracking system may include one or all of the following features. At times it may be desirable to manually override the tracking mode and direct the portion contained within image portion 52 of FIG. 5 any where within the focal area 51 and remain fixed upon that location. Location can also be preset and, with one command, the tracking system will home in on that location. When a conferee desires, he/she may cancel the fixed location setting, and the image manipulated tracking system will automatically find the conferee and resume tracking. Another feature includes the ability to choose the degree of tracking responsiveness so that the tracking will respond quickly, moderately, or slowly to the movements of the conferee. Tight head shots would generally require a quick tracking response to ensure the head remains within the image portion 52. In contrast, full body shots may be tracked more appropriately with a moderate or slow response. Another feature allows the conferee to be tracked while positioned within the image portion 52 to the left or right instead of the center so that flip charts, writing boards, objects, or other persons can also be in view. Still another feature creates an invisible window within the image portion 52 as shown in FIG. 5. The tracking mode is disabled for the area within this window so that the conferee may move to some degree left, right, up or down. This eliminates the constant tracking of a person who sways or moves a lot, without leaving image portion 52. If the conferee moves significantly in one direction, he/she will leave the invisible window and the tracking system will engage. Of course, various combinations can be created from the features already mentioned.

Of all the possible mounting arrangements, mounting the image pickup device at the center top of the image display as shown in FIG. 1 is the preferred perimeter-mounted position. In this position the head of the displayed conferee faces straight ahead and remains relatively undistorted besides a slight enlargement of the displayed conferee's forehead when the conferee is very close to the image pickup device. Mounting the image pickup device to the right or left of the image display results in the displayed image of the conferee who appears to be facing left or right and, as a result, is inferior to the center top-mounted position. Mounting the image pickup device at the center bottom is better than side-mounted positions because the conferee faces straight ahead. However, the center bottom position distorts the neck and chin and the nostrils become pronounced. Although the eye contact image manipulations may be applied to any perimeter-mounted position, the center top allows for the most natural conversational appearance of conferees.

Thus far the eye manipulation processes and the tracking processes have been explained separately from one another. A preferred embodiment of the present invention is a teleconferencing system that links image manipulated tracking with image manipulated eye direction. In this configuration, the eyes of the displayed conferee are image manipulated to follow the movements of the other conferee. This linked system utilizes the spatial orientation of the tracking system not only to frame the conferee, but also to locate where the conferee is positioned so that the image manipulated eyes of the displayed conferee will look towards that position.

Certain problems arise when more than two conferees desire to converse. Multiple conferees at different terminals may converse by splitting the image display into sections. If each distant conferee's terminal sends outgoing image manipulated signals, then each display section would include the present invention. If the distant terminals do not image manipulate, then the receiving terminal would need to image manipulate multiple incoming signals. That is to say, image manipulation, including tracking, could be performed on the signal before it is transmitted to the other terminal or else the entire unmanipulated signal may be transmitted and the receiving terminal would be responsible for the manipulations. In the case of multiple conferees, multiple processors may be needed to image manipulate the multiple incoming images. Another problem arises when two or more conferees are at one terminal. In such cases the pattern recognition processes and image manipulation processes must be designed to accommodate these foreseeable teleconferencing situations.

The present invention also includes means to control the image manipulation processes at a terminal from a remote location. In some applications it may be desirable to control the image manipulated tracking and the panning, tilting, and zooming functions of a particular terminal from another location. In the interests of privacy the conferee would be allowed to disengage the remote control of his/her terminal's image manipulation processes. Remote control could be provided either by transmitting the unmanipulated signal of the entire focal area so that the remote conferee could select a preferred image portion, or by having the remote conferee's terminal send signals to the local terminal to direct image manipulation by the local terminal before the signal is transmitted to the remote terminal.

An optimal embodiment of the present invention will probably require custom hardware. Certainly, mass-produced, specialized hardware would be less expensive. However, at least one preferred embodiment of the present invention can be constructed from off-the-shelf components. The preferred terminal comprises a Sun Microsystems Sparc 10 SXGraphics computer model S10BSX8-51-32-P46 used as the controlling computer for display and final image computation. A Mercury Race Series MCV9 16×16 array processor is used for both pattern recognition and image manipulations. The preferred image pickup device is a Sony DXC-537-AL video camera connected to an Image Technology 150-40 image processing video digitizer. Sound is provided by an omni-directional Sony ECM-672 microphone. This experimental teleconferencing system is directly connected to an identical terminal. The RGB outputs of one terminal is connected to the inputs of the other terminal's monitor. In the same way, the audio signal from one terminal is directly connected to the speaker of the other terminal's Sparc 10. This configuration will image manipulate the outgoing signals to provide proper eye contact and tracking for both conferees. Because the terminals are directly connected, data compression and other problems of long distance broadcast are avoided. By reconfiguring the interconnection, remote image manipulation, as explained above, can also be simulated. That is, rather than sending the already-manipulated RGB signal to the other terminal, the raw digital output of the digitizer is sent so that each Sparc 10 system is actually manipulating and displaying the signal from the other system.

Figure 6:
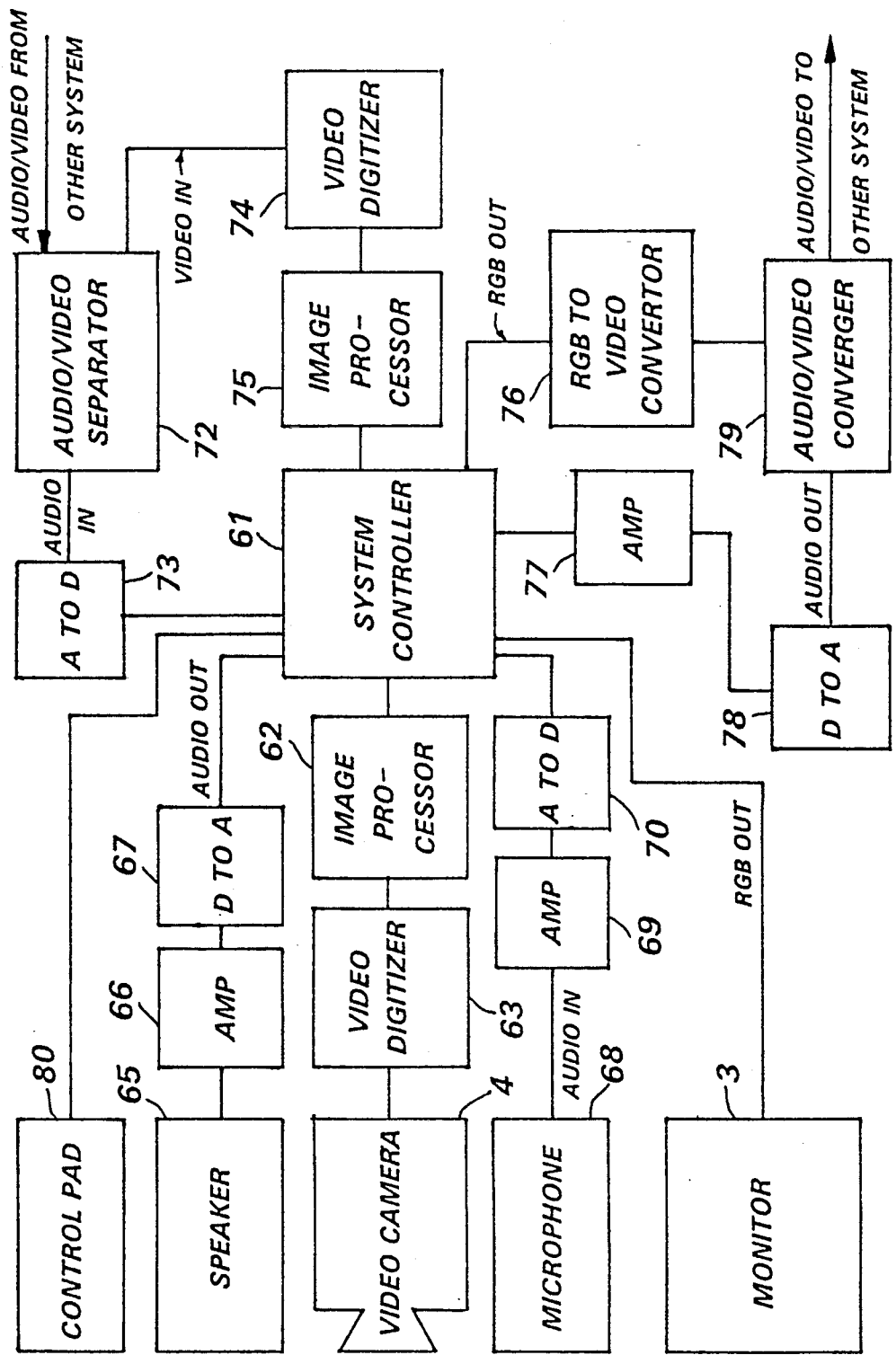
FIG. 6 illustrates one of many possible applications of this present invention.

FIG. 6 is a schematic layout of another, more extensive configuration of the present invention. This layout is designed to image and audio process both outgoing and incoming signals. The system controller 61 controls all processes and consists of common computer hardware such as CPUs and memory. Image processing begins by capturing an image with video camera 4 and using video digitizer 63 to digitize the video signals so that the image processor 62 and the system controller 61 can process the signal. Sound input is picked up by microphone 68, routed through amplifier 69, and converted to digital by analog-to-digital converter 70. The digitized sound signal is processed by the system controller 61 and is then converted from digital to analog by digital-to-analog converter 67, amplified by amplifier 66 and output by speaker 65.

Processed incoming video signals as well as self-view signals are converted by system controller 61 to RGB and then displayed on monitor 3. Incoming and outgoing signals to another terminal may need to have video and audio either processed by a signal separator 72 or converger 79, respectively. Incoming audio before processing is sent to an analog-to-digital converter 73. Incoming video from the separator 72 is routed to video digitizer 74 and image processor 75 and controlled by system controller 61. Processed outgoing RGB signals go to a video converter 76 and into an audio/video converger 79, where they are combined with outgoing processed audio from amplifier 77 and digital-to-analog converter 78. Manual control of the system is provided for by a control pad 80. The rapid pace of computer hardware technology will quickly render this embodiment obsolete. With the production of advanced, high-speed, inexpensive hardware, the entire image acquisition, pattern recognition, image manipulation, audio synching, and outgoing signal processing will readily be combined into a single unit, perhaps as a specialized electronic chip set or even on a single electronic chip.

Figure 7:
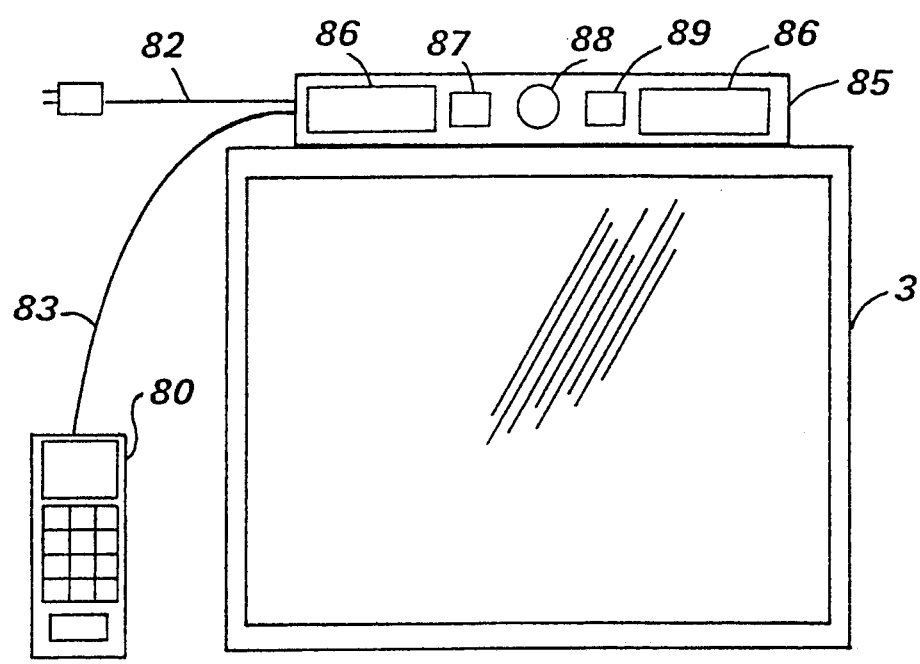
FIG. 7 shows a schematic drawing of one possible layout of one terminal of the present invention.

FIG. 7 illustrates one preferred configuration of the teleconferencing system. The present invention's pattern recognition and image manipulation processor is contained within unit 85 placed on top of a monitor 3. Unit 85 is powered through cord 82 which provides sufficient power for the entire system. Unit 85 also contains speakers 86 and microphone 87 that work in combination as a speaker phone. Also, unit 85 has a light source 89 to illumine the conferee, and a video camera 88 whose direction of aim can be adjusted either manually or electronically. Unit 85 is operated by hand-held phone 80 with a speaker, microphone, and dialing controls. Controls of phone 80 may include tracking and focal direction image manipulation controls, speaker phone on/off, speaker volume control, microphone sensitivity controls, audio on/off, image on/off, self-view on/off which controls a self-view window in the monitor image. Line 83 connects the phone with the teleconferencing device, but may readily be replaced with wireless technology.

Another configuration of the system uses a front projection display device instead of a computer monitor. In this case, unit 85 may be mounted on the screen surface above the projected image display.

Although the embodiments of the present invention discussed thus far include the image manipulation means and pattern recognition means in a package at or near the rest of the terminal, the present invention does not require such a placement. There is no reason why the pattern recognition and image manipulation could not occur at a location removed from either of the conferees. For example, the terminals could transmit audio and video signals to a computer center, perhaps part of the local switching center of the telephone company, where the image processing would occur. Then the processed signal would be routed to the remote terminal. The switching center could accept command signals that would allow either party to the conference to control the tracking or other image manipulation of the teleconference. A central location for the image processing could allow for economies of scale in which super computers would perform the manipulation. Furthermore, with a central location for image manipulation, software could be frequently upgraded in a completely transparent manner to the end users without any compatibility problems. Of course, the present invention also encompasses arrangements that employe some other distribution of functions between the local terminals and a remote location.

While the preferred embodiments of the invention have been demonstrated, modifications and adaptations of such embodiments will be apparent to those skilled in the art. However, it is to be expressly understood that such modifications and adaptations are within the spirit and scope of the present invention as set forth in the following claims.

What is claimed is:

1. A teleconferencing system which enables a conferee at a local terminal to enjoy the appearance of eye contact during a teleconference with a second conferee at a connected remote terminal, the system comprising:
   a terminal which comprises:
      image display means for displaying an image;
      image pickup means for producing a video signal representative of the image of the first conferee, the image pickup means being placed beyond the outside perimeter of the image on the image display means so as not to interfere with the viewing of the image display;
      audio pickup means to produce an audio signal representative of speech and other sounds produced by the first conferee; and
      audio reproduction means for audibly reproducing an audio signal from the remote terminal, the audio signal representative of speech and other sounds produced by the second conferee such that the first conferee and the second conferee can carry out a conversation;
   digitizing means for creating a digital representation of the video signal from the image pickup means;
   signal transmission means for processing audio and video signals from the local terminal and transmitting them to the remote terminal, and receiving audio and video signals from the remote terminal and processing them for use by the local terminal so that the local terminal is connected to the remote terminal;
   orientation means for deriving data representing a spatial orientation of elements of the image of one of the first conferee, the second conferee, and both conferees from a digital representation of the video signal from their respective terminals so as to determine elements of one of the first conferee's gaze, the second conferee's gaze and both conferees' gazes, respectively;
   image manipulation means for using the spatial orientation data to manipulate the digital image representation to create the appearance of eye contact between the first and second conferees to facilitate natural conversation.

2. The teleconferencing system of claim 1, wherein the image manipulation means alters the eyes in the image of one of the conferees such that the direction of the imaged conferee's gaze is changed in a predetermined direction.

3. The teleconferencing system of claim 2 further comprising means for one of the first conferee, the second conferee and both conferees to manually set the direction that the conferee's eyes appear to gaze when altered by the image manipulation means.

4. The teleconferencing system of claim 1 further comprising detection of a position and an orientation of the first conferee by means of a homing device.

5. The teleconferencing system of claim 1, wherein the image manipulation means alters the displayed image to correct distortion caused by a lens on the image pickup device.

6. The teleconferencing system of claim 1 further comprising means for synchronizing the audio signals with the video signals to overcome a delay caused by the image manipulation means.

7. The teleconferencing system of claim 1, wherein the terminal further comprises means for controlling the image manipulation means of the connected terminal.

8. The teleconferencing system of claim 1, wherein the image manipulation means are physically located remotely from the terminal.

9. The teleconferencing system of claim 1, wherein the orientation means are physically located remotely from the terminal.

10. The teleconferencing system of claim 1, wherein the terminal further includes the image manipulation means.

11. The teleconferencing system of claim 1, wherein the terminal further includes the orientation means.

12. The teleconferencing system of claim 1, wherein the orientation means is provided by a pattern recognition device.

13. The teleconferencing system of claim 1, wherein the image manipulation means also uses the spatial orientation data to manipulate the digital image representation to extract a portion of the image immediately surrounding one of the first conferee, the second conferee and both conferees and to cause the portion to fill the image display means of the remote terminal, thereby affording an illusion of tilting, panning, and zooming of the image pickup device without physically moving the image pickup device.

14. A teleconferencing system which enables a first conferee at a local terminal to enjoy a teleconference with a second conferee at a connected remote terminal, the system comprising:
a terminal comprising:
image display means for displaying an image;
image pickup means for producing a video signal representative of the image of the first conferee, the image pickup means being equipped with a lens that produces a field of view substantially larger than that necessary to accommodate the first conferee;
audio pickup means to produce an audio signal representative of speech and other sounds produced by the first conferee; and
audio reproduction means for audibly reproducing an audio signal from the remote terminal, the signal representative of speech and other sounds produced by the second conferee such that the first and second conferees can carry out a conversation;
signal transmission means for processing signals from a local terminal and transmitting them to a remote terminal, and receiving signals from the remote terminal and processing them for use by the local terminal so that the local terminal is connected to the remote terminal;
digitizing means for creating a digital representation of the video signal from the image pickup means;
orientation means for deriving data representing a spatial orientation of elements of the image of one of the first conferee, the second conferee, and both conferees from a digital representation of the video signal from their respective terminals; and
image manipulation means for using the spatial orientation data to manipulate the digital image representation to extract a portion of the image immediately surrounding one of the first conferee, the second conferee, and both conferees and to cause the portion to fill the image display means of one of the remote terminal, the local terminal, and both terminals, respectively thereby affording the illusion of tilting, panning, and zooming of the image pickup device without physically moving the device.

15. The teleconferencing system of claim 14, wherein resolution of the image pickup means is greater than that of the image display means.

16. The teleconferencing system of claim 14, wherein the image manipulation means also uses the spatial orientation data to manipulate the digital image representation to create the appearance of eye contact between conferees at the connected terminals to facilitate natural conversation.

17. The teleconferencing system of claim 14 further comprising detection of a position and an orientation of the first conferee by means of a homing device.

18. The teleconferencing system of claim 14, wherein the image manipulation means alters the displayed image to correct distortion caused by a lens on the image pickup device.

19. The teleconferencing system of claim 14 further comprising means for synchronizing the audio signals with the video signals to overcome a delay caused by the image manipulation means.

20. The teleconferencing system of claim 14 further comprising means for controlling image manipulation on the connected remote terminal.

21. The teleconferencing system of claim 14, wherein the image manipulation means are physically located remotely from the terminal.

22. The teleconferencing system of claim 14, wherein the orientation means are physically located remotely from the terminal.

23. The teleconferencing system of claim 14, wherein the terminal further includes the image manipulation means.

24. The teleconferencing system of claim 14, wherein the terminal further includes the orientation means.

25. The teleconferencing system of claim 14, wherein the orientation means is provided by a pattern recognition device.

26. A teleconferencing system which enables a first conferee at a local terminal to enjoy an appearance of eye contact during a teleconference with a second conferee at a connected remote terminal, the system comprising:
a terminal which comprises:
a monitor for displaying an image;
a video camera for producing a video signal representative of the image of the first conferee, the video camera being placed beyond the outside perimeter of the image on the monitor so as not to interfere with the viewing of the image display;
a microphone and associated electronics to produce an audio signal representative of speech and other sounds produced by the first conferee; and
a speaker and associated electronics for audibly reproducing an audio signal from the remote terminal, the signal representative of speech and other sounds produced by the second conferee such that the first and the second conferees can carry out a conversation;
a video digitizer for creating a digital representation of the video signal from the video camera;
a system controller for controlling the system and processing the audio and video signals comprising:
a central processing unit with memory for executing program instructions;

pattern recognition means for deriving data representing a spatial orientation of elements of an image of one of the first conferee, the second conferee and both conferees from the digital representation of the video signal so as to determine elements of one of the first conferee, the second conferee, and both conferees, respectively characteristic of one of the first conferee's gaze, the seconds conferee's gaze, and both conferee's gazes, respectively; and image manipulation means for using the spatial orientation data to manipulate the digital image representation to create a natural conversational appearance of eye contact between conferees at the connected local and remote terminals; and signal transmission means for processing signals from the system controller and transmitting them to the remote terminal, and receiving signals from the remote terminal and processing them for use by the system controller so that the local terminal is connected to the remote terminal.

27. The teleconferencing system of claim 26, wherein the video camera is equipped with a lens that images a field of view greater than that necessary to accommodate the first conferee, and wherein the image manipulation means also uses the spatial orientation data to manipulate the digital image representation to extract a portion of the image immediately surrounding the first conferee and to cause the portion to completely fill the image on the monitor of the remote terminal, thereby affording the illusion of tilting, panning and zooming of the image pick-up device without physically moving the image pick-up device.

28. The teleconferencing system of claim 26, wherein the system controller is at a location physically remote from the terminal.

29. The teleconferencing system of claim 14, wherein the image manipulation means further includes enhancement of apparent image resolution.

* * * * *